June 22, 1965  A. F. KOPASKA  3,190,367
AGRICULTURAL GROUND CONDITIONING IMPLEMENT
Filed Jan. 27, 1964  2 Sheets-Sheet 1
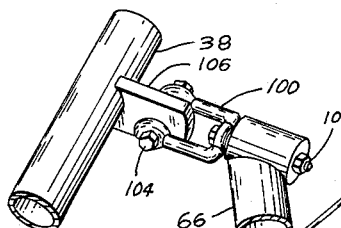
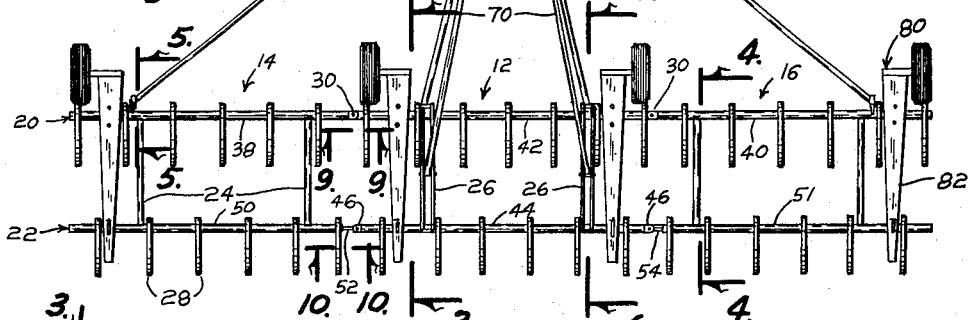
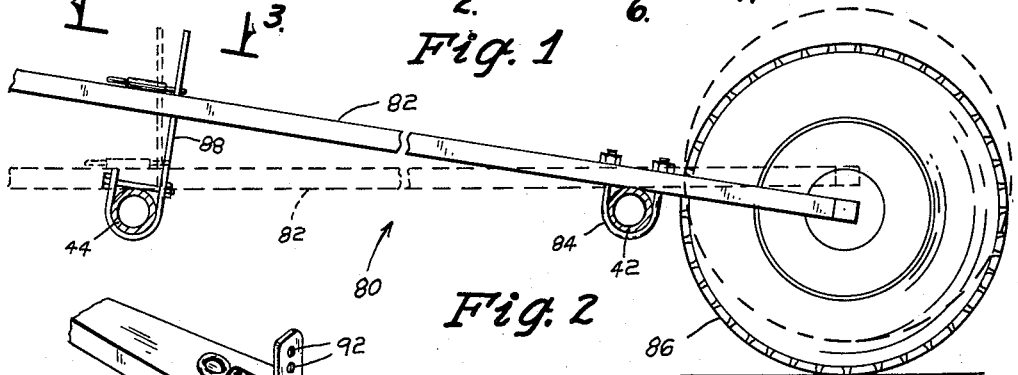
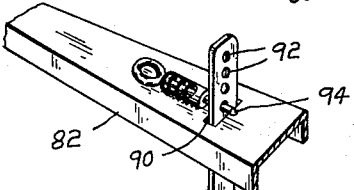
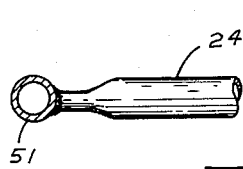
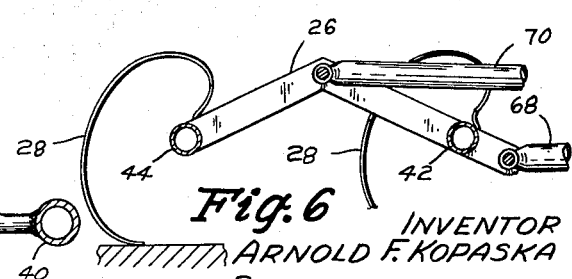
INVENTOR
ARNOLD F. KOPASKA
BY
Dick & Zarley
ATTORNEYS June 22, 1965  A. F. KOPASKA  3,190,367
AGRICULTURAL GROUND CONDITIONING IMPLEMENT
Filed Jan. 27, 1964  2 Sheets-Sheet 2
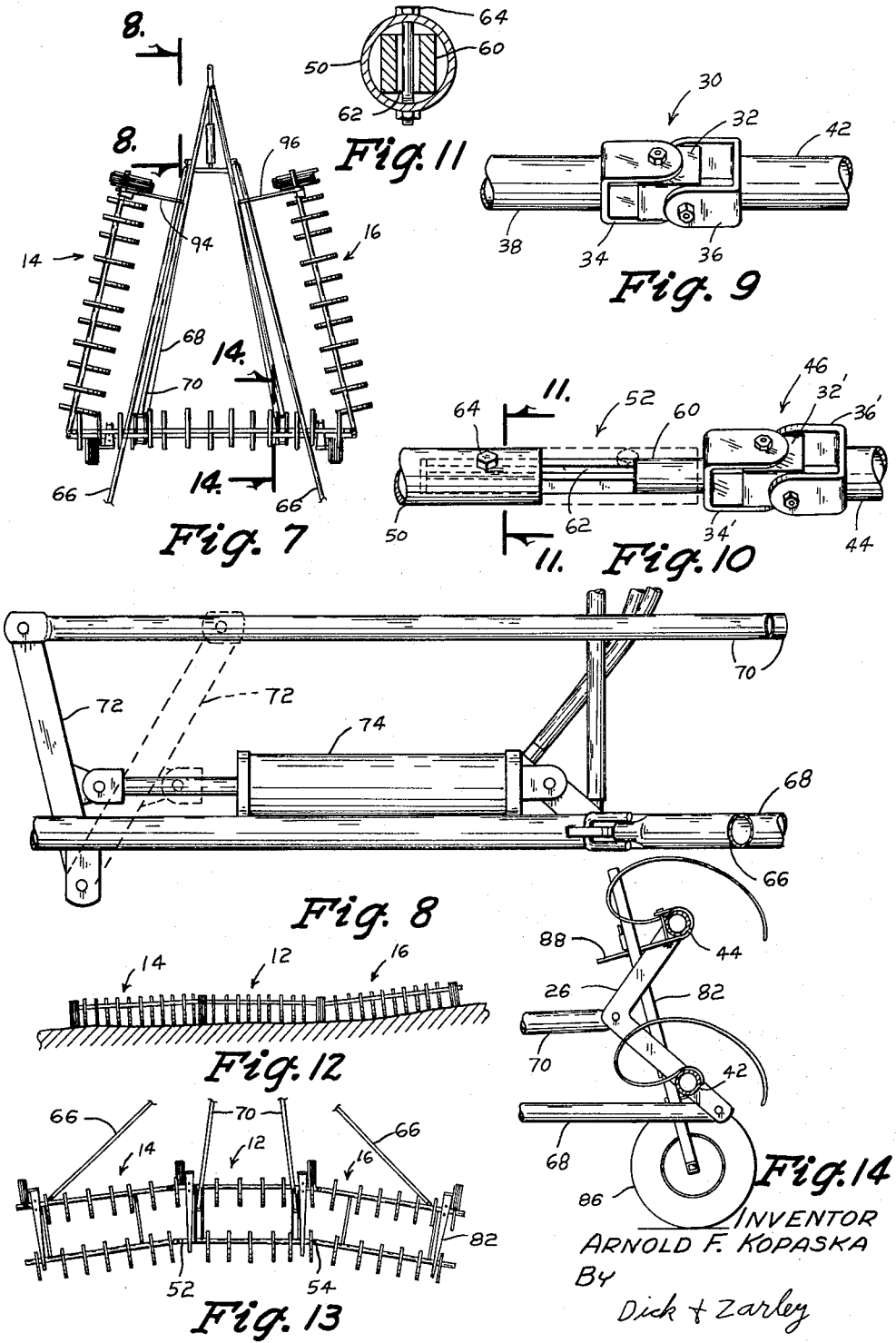
INVENTOR
ARNOLD F. KOPASKA
BY
Dick & Zarley
ATTORNEYS

United States Patent Office 3,190,367
Patented June 22, 1965

3,190,367
AGRICULTURAL GROUND CONDITIONING
IMPLEMENT
Arnold F. Kopaska, Guthrie Center, Iowa
Filed Jan. 27, 1964, Ser. No. 340,377
12 Claims. (Cl. 172—456)

This invention relates to a farm implement which is drawn behind a tractor or the like and in particular to farm implements having a plurality of sections which are hinged together.

Representative of the earlier versions of this type of an implement is the harrow transport in Patent No. 2,970,658, wherein a number of harrow sections are drawn behind a drawbar having wing portions hinged to a center member. Heretofore, it has been only possible to satisfactorily hinge together the sections of a single transversely extending frame. Where the implement section has included two transverse frame portions, it has been found impractical heretofore to hinge the two frame portions of one section to adjacent frame portions of another section. The farm implement, to work satisfactorily, must have the capability of permitting its wing sections to pivot both vertically and horizontally with respect to the center section. There are two main reasons for this requirement. The first is that it is obviously important that the implement sections maintain continuous contact with the surface of the earth as it is being used to condition the soil and, therefore, the wing sections must be able to pivot in a vertical plane. Also, the drawbar means securing the wing sections to the tractor or the like tend to be extended by wear or for other reasons thereby letting the wing section fall slightly behind the center section. In a farm implement section which is pivoted at a forward and rearward point to an adjacent section, strain and wear will occur in the pivot joints between the sections. The second reason is that the implement sections must be capable of being pivoted from a horizontal plane to a vertical plane for transporting and also pivoting the wing sections about a vertical axis in close to the center section to reduce the overall transverse length of the farm implement. Furthermore, if the wing sections of the farm implement are not pivoted inwardly toward the center section, then the wing sections must be able to pivot about a horizontal axis through each of the hinge connections to the center section as the implement sections ride over irregular terrain. For instance, one of the outer wing sections may hit an obstruction and may be raised relative to the center section making it necessary that it be pivoted at each of its hinge connections to the center section. Otherwise, severe strain will be placed on the forward and rear hinges between the wing and center sections and possibly even breakage will occur.

Another problem presented by an implement having wing sections which are pivoted at forward and rearward points to a center section is that even when an extendable joint is used as hereinafter disclosed in combination with a universal joint capable of pivoting in two planes, the outer peripheral edge of the sections with respect to the inner pivotal hinge joint move out of alignment thereby imposing strain upon the outer extendable universal joint.

Therefore, it is one of the objects of this invention to provide a farm implement having wing sections which are pivoted at forward and rearward points to a center section.

It is a further object of this invention to provide a farm implement having wing sections which are pivoted at forward and rearward points to a center section wherein pivotal hinge joint is extendable.

A still further object of this invention is to provide a farm implement having wing sections which are unitary and pivoted at rearward and forward points to a center section wherein the outer hinge joint is extendable and is provided with means for maintaining outer angular edge alignment between the two sections.

It is still a further object of this invention to provide a farm implement having unitary sections which are pivotally connected together wherein means has been utilized for eliminating strain on the hinge pivotal joints.

It is still a further object of this invention to provide a farm implement having unitary sections pivotally connected together at more than one point wherein the sections may be pivoted to a vertical transport position without placing strain on the hinge connections when the implement is drawn over irregular terrain in transporting.

It is still a further object of this invention to provide a farm implement having unitary sections pivotally connected together at forward and rearward points wherein pivotal and detachable wheel support means are provided for the implement sections.

A further object of this invention is to provide a farm implement having a plurality of unitary sections which have wheel support units which are pivotally connected thereto and cooperate with means to adjust the working depth of the implement in the ground.

A still further object of this invention is to provide a farm implement having a plurality of hinged together sections which may be mechanically operated from power means on the prime mover for use in conditioning the soil and moving during transporting.

A still further object of this invention is to provide an agricultural ground conditioning implement which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top plan view of the spring tooth harrow of this invention;

FIG. 2 is a side elevation cross-sectional view taken along line 2—2 in FIG. 1 showing in particular the wheel support structure and the manner in which it may be adjusted relative to the implement sections;

FIG. 3 is a fragmentary top view taken along line 3—3 in FIG. 2 showing in particular the adjusting means on the wheel support assembly;

FIG. 4 is a cross-sectional elevational view taken along line 4—4 in FIG. 1 and showing in particular the connecting members between the forward and rearward frame assemblies;

FIG. 5 is a cross-sectional view taken along line 5—5 in FIG. 1 showing in particular the connection between the wing section and the hitch assembly;

FIG. 6 is a cross-sectional view taken along line 6—6 in FIG. 1 showing in particular the spring tooth construction of the implement and the means for pivoting the implement sections from a horizontal plane to a vertical plane;

FIG. 7 is a top plan view of the spring tooth harrow in its transport position with the implement sections extending upwardly;

FIG. 8 is a fragmentary side elevation view taken along line 8—8 in FIG. 7 showing in particular the hitch assembly and the hydraulic power assembly for raising and lowering the implement sections;

FIG. 9 is a top and side perspective view taken along line 9—9 in FIG. 1 of the two-way universal joint connecting a wing unit frame member to a center unit frame member;

FIG. 10 is a top and side perspective view taken along line 10—10 in FIG. 1 showing in particular the extendable telescopic joint used in combination with the universal joint for connecting a frame member in the wing unit to a frame member in the center unit;

FIG. 11 is an elevational cross-sectional view taken along line 11—11 in FIG. 10 showing in particular the details of the extendable unit construction;

FIG. 12 is a rear elevational view of the spring tooth implement of this invention shown in use on irregular terrain wherein the wing units are at an angle to the center units;

FIG. 13 is a top plan fragmentary view of the spring tooth harrow of this invention showing in particular the wing units pivoted rearwardly relative to the center unit; and FIG. 14 is a side elevational cross-sectional view taken along line 14—14 in FIG. 7 showing the center section or unit in its raised transporting position.

The spring tooth harrow of this invention is referred to in FIG. 1 by the reference numeral 10 and comprises a center unitary section 12 with wing sections 14 and 16. A hitch assembly 18 is connected to the center section 12 and wing sections 14 and 16 and adapted to be connected to a tractor or the like (not shown).

Extending through the wing sections 14 and 16 and the center section 12 are two frame assemblies, the forward frame 20 and the rearward frame 22 which are coupled together by members 24 in the wing sections 14 and 16 and by the inverted V-shaped members 26 in the center section 12.

Along the length of each of the frame assemblies 20 and 22, spring teeth 28 are secured in a conventional manner.

The forward frame assembly 20 is provided with a two-way universal joint 30 for connecting the forward edge of the sections 14 and 16 to the center section 12. This universal joint is more clearly illustrated in FIGS. 9 and 10 and is shown to include a center block 32 pivotally connected to clevis members 34 and 36 in vertical and horizontal planes respectively. The clevis members 34 and 36 in turn are connected to forward frame assembly portions 38 and 40 of the wing units 14 and 16 and a frame portion 42 of the center section 12.

As best seen in FIGS. 1 and 10, the rear frame assembly 22 comprises a center frame portion 44 which is connected by universal joints 46 to frame portions 50 and 51 of the wing units 14 and 16. The universal joints 46 are similar to universal joints 30 with two exceptions. One is they cooperate with the telescopic extension units 52 and 54 which in turn are connected to the rear frame assembly portions 50 and 51 in the wing units 14 and 16 respectively. These extension units are similar and in FIGS. 10 and 11 are shown to include a rectangular and cross-section member 60 provided with an elongated slot 62 which receives a stop bolt member 64 carried by the frame portion 50. Thus, it is seen that the overall length of the rear frame assembly 22 may be extended a distance of the total length of the extension unit slots 62 in each of the wing units 14 and 16.

The other difference between the universal joints 46 and the universal joints 30 is that the block 32′ has a small space between its outer face and the inner face of the leg portions of the clevis 36′ to permit movement along its pivotal axis. On the other hand, the clevis 34′ may be closely spaced in embracing relationship about the block 32′. The reason for this clearance or space between the clevis portions 36′ and the block 32′ will become apparent hereinafter.

As is obvious from the drawings, especially FIGS. 1 and 13, the wing units 14 and 16 may pivot rearwardly with respect to the center unit 12. As the wing units 14 and 16 move rearwardly, the rearward frame portions move inwardly toward the center section 12 as, for instance, note the dotted line position of the frame portion 50 in the extension joint 52 in FIG. 10. However, as the wing units 14 and 16 pivot rearwardly, the longitudinal axis of the rear frame portions 50 and 51 no longer intersect the longitudinal axis of the frame portion 44 at the universal joints 46. What is required is that the clevis portion 36′, as shown in FIG. 13, be moved a small distance rearwardly to bring the frame sections 50 and 44 into alignment to intersect at the universal joint 46. It has been found that an implement having units with lengths of ten feet may move rearwardly at their outer ends two feet with the use of an extension unit having an eight inch slot. For this amount of outer circumferential movement of the wing units, there must be a quarter inch space between each of the portions of the clevis 36′ and the block 32′ to bring the frame portions 50 and 51 into alignment with the extension joints 52 and 54 and the universal joints 46. Accordingly, by the provision of this small quarter inch play between the universal joint block 32′ and the portions of the clevis 36′ the extension joints 52 and 54 will freely operate without binding to allow the wings 14 and 16 to move to their normal position in the event, for instance, the wing hitch members 66 should be extended to allow the wing units 14 and 16 to rotate rearwardly. It is also noted that hereinafter a second and important function of this play in the universal joints 46 will be described in connection with the raising of the sections to their vertical positions for transporting.

The hitch assembly 18, as indicated, includes the members 66 which extend angularly rearwardly and are connected to the wing units 14 and 16 at the frame assembly 20 portions 38 and 40 respectively. The hitch assembly 18 also includes a pair of members 68 which are pivotally connected to the members 26 which interconnect the forward and rearward frame portions 42 and 44. As shown in FIG. 14, the members 68 are connected to the members 26 at their forward ends forwardly of the frame portion 42. At the apex of the V-shaped member 26 hydraulically operated push pull rods 70 are pivotally connected at one end with their other ends connected to an upstanding pivot arm 72 (FIG. 8) which is in turn pivotally connected to the hitch assembly 18. Intermediate the ends of the arm 72 a hydraulic assembly 74 is connected which has its other end secured to the hitch assembly 18. The hydraulic means 74 is operated in a conventional manner by the tractor or the like pulling the implement 10.

As seen in FIGS. 1, 2 and 14, wheel support assemblies 80 are provided for each of the implement sections or units 12, 14 and 16. Each of these wheel support assemblies include a support member 82 which is detachably and pivotally connected to the forward frame portions 38, 42 and 40 by a U-bolt 84. At the forward end of the member 82 is a wheel 86. The opposite end from the wheel 86 is vertically adjustable relative to the frame portions 50, 44 and 51. This is accomplished by a J-shaped bracket 88 which is secured to each of the frame portions 50, 44 and 51 and extends through an opening 90 in the member 82. A plurality of holes 92 are provided in the upper end of the J-shaped bracket 88 and are adapted to receive a spring loaded pin 94. Thus the depth of the spring teeth 28 may be adjusted by raising and lowering the member 82 which pivots about the forward frame portions 38, 42 and 40, as shown in FIG. 2. Similarly, when the hydraulic cylinder 74 is extended, as shown by the solid line position in FIG. 8, the implement units 12, 14 and 16 will be raised to their vertical position, as shown in FIG. 14 by pivoting on the wheels 86.

When the implement 10 is in its transporting position, as shown in FIG. 14, fully extended transversely it is apparent why the clearance between the block 32′ and the portions of the clevis 36′ in the universal joint 46, as shown in FIG. 10, are important and necessary. For instance, should the outer wheels 86 carrying the wing units 14 and 16 pass over a low spot, the units 14 and 16 would not be able to maintain contact with the ground unless they were able to pivot downwardly as they pivoted rearwardly in FIG. 13 when in the ground working position. Accordingly, by providing the quarter inch space between the clevis portions and the block, the alignment along the rear frame assembly 22 may be maintained such that the extension units 52 and 54 may operate freely without binding.

It is to be understood that the extension units 52 and 54 could be placed in the forward frame assembly 20, in such case they would be retracted in normal use and adapted to be extended when the outer units 14 and 16 pivot rearwardly, as shown in FIG. 13, or downwardly when in the transporting position.

If it becomes necessary to reduce the overall length of the implement 10 for transporting purposes, then the wing units 14 and 16 may be pivoted forwardly toward the hitch assembly 18, as shown in FIG. 7 where the outer ends of the wing units 14 and 16 are secured to the hitch assembly by members 94 and 96. But first, the members 66 extending from the hitch assembly 18 to the wing units 14 and 16 are disconnected and layed back over the top of the center section 12, as shown in FIG. 7. The connection between the members 66 and the wing unit 14 is shown in FIG. 5 to include a U-member 100 rotatably connected by bolt 102 to the outer end of the member 66. A pull out pin 104 in turn extends through the free ends of the U-shaped member 100 to connect it to an element 106 affixed to the outer edge of the frame portion 38. Accordingly, the members 66 are easily disconnected from the wing units 14 and 16 by simply pulling the release pin 104.

Some changes may be made in the construction and arrangement of my agricultural ground conditioning implement without departing from the real spirit and purpose of my invention, and it is my intention to cover by my claims, any modified forms of structure or use of mechanical equivalents which may be reasonably included within their scope.

I claim:

1. An agricultural ground conditioning implement adapted to be pulled behind a tractor or the like, said implement comprising,
   a first frame assembly including a center member and wing members,
   hinge means for connecting said wing members to opposite ends of said center member for pivotal movement therebetween about vertical and horizontal axes,
   a second frame assembly including a center member and wing members,
   hinge means for said second frame connecting the wing members to opposite ends of said center member for pivotal movement therebetween about vertical and horizontal axes,
   and wheel means for each of said members of one frame assembly,
   a wheel support means pivotally connected to each of said frame members of said one frame assembly and vertically adjustably connected to the adjacent frame member of the other frame assembly, and said wheel means for each of said members being rotatably connected to the wheel support means pivotally connected thereto.

2. An agricultural ground conditioning implement adapted to be pulled behind a tractor or the like, said implement comprising,
   a first frame assembly including a center member and wing members,
   hinge means for connecting said wing members to opposite ends of said center member for pivotal movement therebetween about vertical and horizontal axes,
   a second frame assembly including a center member and wing members,
   hinge means for said second frame connecting the wing members to opposite ends of said center member for pivotal movement therebetween about vertical and horizontal axes,
   means for interconnecting said frame assemblies and maintaining them in spaced substantially parallel relationship with one behind the other and connecting adjacent members of said first and second frames together for said adjacent wing members to pivot at times as a unit in unison relative to said first and second frame center members coupled as a unit, and
   an extension means provided for each wing unit to vary one frame assembly's total length along a line through the pivotal hinge means connection between its center member and wing member thereby allowing each wing unit to pivot about a vertical axis extending through the hinge means connecting the opposite adjacent center member to its wing member.

3. An agricultural ground conditioning implement adapted to be pulled behind a tractor or the like, said implement comprising,
   a first frame assembly including a center member and wing members,
   hinge means for connecting said wing members to opposite ends of said center member for pivotal movement therebetween about vertical and horizontal axes,
   a second frame assembly including a center member and wing members,
   hinge means for said second frame connecting the wing members to opposite ends of said center member for pivotal movement therebetween about vertical and horizontal axes,
   means for interconnecting said frame assemblies and maintaining them in spaced substantially parallel relationship with one behind the other and connecting adjacent members of said first and second frames together for said adjacent wing members to pivot at times as a unit in unison relative to said first and second frame center members coupled as a unit, and
   extension means provided for each wing unit to vary one frame assembly's total length along a line through the pivotal hinge means connection between its center member and wing member thereby allowing each wing unit to pivot about a vertical axis extending through the hinge means connecting the opposite adjacent center member to its wing member,
   and means associated with each frame assembly adapted to maintain alignment between the extension means and the adjacent portions of the frame assembly thereby permitting the extension means to freely be extended when said wing units are pivoted in a horizontal plane relative to center unit.

4. An agricultural ground conditioning implement adapted to be pulled behind a tractor or the like, said implement comprising,
   a first frame assembly including a center member and wing members,
   hinge means for connecting said wing members to opposite ends of said center member for pivotal movement therebetween about vertical and horizontal axes,
   a second frame assembly including a center member and wing members,
   hinge means for said second frame connecting the wing members to opposite ends of said center member for pivotal movement therebetween about vertical and horizontal axes,
   means for interconnecting said frame assemblies and maintaining them in spaced substantially parallel relationship with one behind the other and connecting adjacent members of said first and second frames together for said adjacent wing members to pivot at times as a unit in unison relative to said first and second frame center members coupled as a unit, and wheel means for each of said members of one frame assembly, a wheel support means pivotally connected to each of said frame members of said one frame assembly and vertically adjustably connected to the adjacent frame member of the other frame assembly, said wheel means for each of said members being rotatably connected to the wheel support means pivotally connected thereto, each of said wheel means being disposed on the opposite side of said one frame member from the other adjacent frame member of each respective unit.

5. An agricultural ground conditioning implement adapted to be pivotally connected behind a tractor or the like, said implement comprising, a first frame assembly including a center member and wing members, hinge means for connecting said wing members to opposite ends of said center member for pivotal movement therebetween about vertical and horizontal axes, a second frame assembly including a center member and wing members, hinge means for said second frame connecting the wing members to opposite ends of said center member for pivotal movement therebetween about vertical and horizontal axes, means for interconnecting said frame assemblies and maintaining them in spaced substantially parallel relationship with one behind the other and connecting adjacent members of said first and second frames together for said adjacent wing members to pivot at times as a unit in unison relative to said first and second frame center members coupled as a unit, wheel means provided for each of said members of one frame assembly, a wheel support member rotatably connected to each wheel and pivotally connected to the adjacent frame member, said support member having a portion vertically adjustably connected to the adjacent member of the other frame assembly thereby permitting said units to pivot vertically about the axis of pivotal connection of the unit to the tractor of said one frame assembly.

6. An agricultural ground conditioning implement adapted to be pulled behind a tractor or the like, said implement comprising, a rearward frame assembly including a center member having wing members at each end thereof, a universal joint operatively connecting each of said wing members to said center member, said universal joint capable of pivotal movement about axes extending at 90° to each other, said axes being disposed in vertical and horizontal planes when said implement is in its normal ground working position, a telescopic extension unit connected to each of said universal joints and to one of the adjacent frame members, each of said universal joints including a first portion connected to said center member and a second portion connected to the adjacent wing member, one of said portions adapted to pivot about a horizontal axis when said implement is in its normal ground working position, said one portion being loosely mounted in said joint to allow a small amount of movement along said horizontal axis to maintain the longitudinal axis of said one portion in parallel alignment with said adjacent frame member to permit said telescopic extension units to freely operate, a forward frame assembly including a center member having wing members at each end thereof, a universal joint connecting each of said wing members to said center member of said rear frame assembly, said joint capable of pivotal movement about axes extending at 90° to each other, said axis being disposed in vertical and horizontal planes when said implement is in its normal opened working position, and means for interconnecting members of the forward frame assembly to adjacent members of the rear assembly to provide a center unit and wing units at each side thereof.

7. An agricultural ground conditioning implement adapted to be pulled behind a tractor or the like, said implement comprising, a rearward frame assembly including a center member having wing members at each end thereof, a universal joint operatively connecting each of said wing members to said center member, said universal joint capable of pivotal movement about axes extending at 90° to each other, said axes being disposed in vertical and horizontal planes when said implement is in its normal ground working position, a telescopic extension unit connected to each of said universal joints and to one of the adjacent frame members, each of said universal joints including a first portion connected to said center member and a second portion connected to the adjacent wing member, one of said portions adapted to pivot about a horizontal axis when said implement is in its normal ground working position, said one portion being loosely mounted in said joint to allow a small amount of movement along said horizontal axis to maintain the longitudinal axis of said one portion in parallel alignment with said adjacent frame member to permit said telescopic extension units to freely operate, a forward frame assembly including a center member having wing members at each end thereof, a universal joint connecting each of said wing members to said center member of said rear frame assembly, said joint capable of pivotal movement about axes extending at 90° to each other, said axis being disposed in vertical and horizontal planes when said implement is in its normal opened working position, means for interconnecting members of the forward frame assembly to adjacent members of the rear assembly to provide a center unit and wing units at each side thereof, wheel means provided for each of said members of one frame assembly, a wheel support member rotatably connected to each wheel and pivotally connected to the respective member of said one frame assembly, and adjustable means provided for adjustably connecting each of said support members to said adjacent member of the other frame assembly whereby said center and wing units may be pivoted relative to each other about a longitudinal axis extending through said pivotal connections of said forward and rearward assembly members to the members of the center unit of said wing units.

8. The structure of claim 6 wherein means is provided in each of said telescopic units for limiting the length to which the unit may be extended.

9. An agricultural ground conditioning implement adapted to be pulled behind a tractor or the like, said implement comprising, a forward elongated frame assembly, a rearward elongated frame assembly, means interconnecting said frame assemblies to form a unit and maintaining them in parallel spaced relation to each other, ground conditioning means on each of said frame assemblies for engagement with the ground when said unit is in its normal horizontal position, at least one wheel means, a wheel support means pivotally connected to one of said frame assemblies, said wheel means being rotatably connected to one end of said wheel support means adjacent said one frame assembly, the other end of said wheel support means being held by adjustable means to said other frame assembly, draft means pivotally connected to said forward elongated frame assembly, and power means for pivoting said unit vertically about an axis extending through said pivotal connection between said draft means and said forward frame assembly whereby said unit may be moved to a vertical position for transporting and to a horizontal position for working the ground, and said adjustable means adapted to permit additional variation in the vertical height of said unit relative to the ground when the unit is in its horizontal position.

10. An agricultural ground conditioning implement adapted to be pulled behind a tractor or the like, said implement comprising, a forward elongated frame assembly, a rearward elongated frame assembly, means interconnecting said frame assemblies to form a unit and maintaining them in parallel spaced relation to each other, ground conditioning means on each of said frame assemblies for engagement with the ground when said unit is in its normal horizontal position, at least one wheel means, a wheel support means pivotally connected to one of said frame assemblies, said wheel means being rotatably connected to one end of said wheel support means adjacent said one frame assembly, the other end of said wheel support means being held by adjustable means to said other frame assembly, power means for pivoting said unit in a vertical plane about an axis extending through the rotatable connection between said wheel means and said wheel support means, said wheel means being disposed on the opposite side of said one frame assembly from said other frame assembly when said unit is in its horizontal position, said power means being adapted to move said unit to a vertical position for transporting and to said horizontal position for working the ground.

11. An agricultural ground conditioning implement adapted to be pulled behind a tractor or the like, said implement comprising, a first frame assembly including a center member and wing members, hinge means for connecting said wing members to opposite ends of said center member for pivotal movement therebetween about vertical and horizontal axes, a second frame assembly including a center member and wing members, hinge means for said second frame connecting the wing members to opposite ends of said center member for pivotal movement therebetween about vertical and horizontal axes, and means for interconnecting said frame assemblies and maintaining them in spaced substantially parallel relationship along the line of travel and connecting adjacent members of said first and second frames together for said adjacent wing members to pivot at times as a unit in unison relative to said first and second frame center members coupled as a unit, each of said hinge means for one frame assembly connecting the wing member to said center member including a block element pivotally connected to a pair of U-shaped members connected to said center member and said wing member, the pivotal axes of said U-shaped members being at 90° to each other, at least one of said U-shaped members having an opening to receive said block element which is larger than the thickness of said block in said opening whereby said center member and wing member may move relative to each other along the length of said pivotal axis extending through said one U-shaped member, and an extension means provided for each wing unit to vary said one frame assembly's total length.

12. An agricultural ground conditioning implement adapted to be pulled behind a tractor or the like, said implement comprising, a forward elongated frame assembly, a rearward elongated frame assembly, means interconnecting said frame assemblies to form a unit and maintaining them in parallel spaced relation to each other, ground conditioning means on each of said frame assemblies for engagement with the ground when said unit is in its normal horizontal position, at least one wheel means, a wheel support means pivotally connected to one of said frame assemblies, said wheel means being rotatably connected to said wheel support means adjacent said one frame assembly, adjustable means interconnecting said wheel support means to said other frame assembly, draft means pivotally connected to said forward elongated frame assembly, and power means for pivoting said unit vertically about an axis extending through said pivotal connection between said draft means and said forward frame assembly whereby said unit may be moved to a vertical position for transporting and to a horizontal position for working the ground, and said adjustable means adapted to permit additional variation in the vertical height of said unit relative to the ground when the unit is in its horizontal position.

References Cited by the Examiner

UNITED STATES PATENTS 3,033,296   5/62   Kaufman et al. _____ 172—311 X
3,091,296   5/63   Lohrman et al. _____ 172—413 X ANTONIO F. GUIDA, *Acting Primary Examiner.*

T. GRAHAM CRAVER, *Examiner.*